United States Patent
Huang et al.

(10) Patent No.: US 11,608,817 B2
(45) Date of Patent: Mar. 21, 2023

(54) ELECTRO-RESPONSIVE FOLDING AND UNFOLDING COMPOSITE MATERIAL FOR 4D PRINTING, METHOD FOR MANUFACTURING SAME, AND METHOD FOR REGULATING SHAPE MEMORY BEHAVIOR THEREOF

(71) Applicant: Jiangsu University, Suzhou (CN)

(72) Inventors: Shu Huang, Jiangsu (CN); Hang Zhang, Jiangsu (CN); Mingyuan Shan, Jiangsu (CN); Jie Sheng, Jiangsu (CN); Jinzhong Lu, Jiangsu (CN); Jianzhong Zhou, Jiangsu (CN); Jiean Wei, Jiangsu (CN); Shuangliu Zhou, Jiangsu (CN); Wei Xu, Jiangsu (CN)

(73) Assignee: Jiangsu University, Jiangsu (CN)

( * ) Notice: Subject to any disclaimer, the term of this patent is extended or adjusted under 35 U.S.C. 154(b) by 43 days.

(21) Appl. No.: 17/600,120

(22) PCT Filed: Nov. 5, 2020

(86) PCT No.: PCT/CN2020/126672
§ 371 (c)(1),
(2) Date: Sep. 30, 2021

(87) PCT Pub. No.: WO2022/088219
PCT Pub. Date: May 5, 2022

(65) Prior Publication Data
US 2022/0325702 A1     Oct. 13, 2022

(30) Foreign Application Priority Data
Oct. 29, 2020   (CN) .......................... 202011181057.8

(51) Int. Cl.
*F03G 7/06*     (2006.01)
*B33Y 10/00*    (2015.01)
(Continued)

(52) U.S. Cl.
CPC ............ *F03G 7/0614* (2021.08); *B23K 26/21* (2015.10); *B29C 64/188* (2017.08); *B33Y 10/00* (2014.12);
(Continued)

(58) Field of Classification Search
CPC ....... F03G 7/0614; B33Y 10/00; B33Y 80/00; B23K 26/21; B23K 2101/38;
(Continued)

(56) References Cited

U.S. PATENT DOCUMENTS 10,683,400 B1 *   6/2020   Rodriguez ......... C08G 18/0804
11,492,434 B2 *  11/2022   Emami ................. C08F 220/56
(Continued)

FOREIGN PATENT DOCUMENTS

| CN | 105336846 | 2/2016 |
| CN | 109228302 | 1/2019 |

(Continued)

OTHER PUBLICATIONS

"International Search Report (Form PCT/ISA/210) of PCT/CN2020/126672," dated Jul. 26, 2021, pp. 1-6.
(Continued)

*Primary Examiner* — Forrest M Phillips
(74) *Attorney, Agent, or Firm* — JCIP Global Inc.

(57) ABSTRACT

The present invention relates to the field of 4D printing, and particularly to an electro-responsive folding and unfolding composite material for 4D printing, a method for manufacturing the same, and a method for regulating shape memory behavior thereof. In the process of layer-by-layer printing, conductive layers are embedded into a pre-designed shape memory polymer matrix through spray-coating and laser-irradiation nano-fusion welding, to manufacture a folding and unfolding structure with electro-responsive shape memory behavior. The distribution and range of heat
(Continued)

affected zones in the electro-responsive shape memory folding and unfolding structure are controlled by adjusting the number of electric heating layers energized and the value of an energizing voltage. The speed of shape recovery and the degree of shape recovery of the structure are regulated according to a magnitude relationship between a shape recovery force $F_{recovery}$ and a resistance $F_{resistance}$ to shape recovery of the structure.

20 Claims, 3 Drawing Sheets

(51) Int. Cl.
    *B33Y 80/00*     (2015.01)
    *B23K 26/21*     (2014.01)
    *B29C 64/188*     (2017.01)
    *H02N 10/00*     (2006.01)
    *B23K 101/38*     (2006.01)
    *B29K 75/00*     (2006.01)

(52) U.S. Cl.
    CPC .............. *B33Y 80/00* (2014.12); *H02N 10/00* (2013.01); *B23K 2101/38* (2018.08); *B29K 2075/00* (2013.01); *B29K 2995/0096* (2013.01); *H05B 2203/017* (2013.01); *H05B 2214/04* (2013.01)

(58) Field of Classification Search
    CPC .. B29C 64/188; H02N 10/00; B29K 2075/00; B29K 2995/0096; H05B 2214/04
    See application file for complete search history.

(56) References Cited

U.S. PATENT DOCUMENTS

2016/0158828 A1*   6/2016   Tanaka ................... B33Y 10/00
    164/12
2017/0174910 A1*   6/2017   Nowak ................ C08G 18/348

FOREIGN PATENT DOCUMENTS

| CN | 109880328 | 6/2019 |
|----|-----------|--------|
| CN | 110957133 | 4/2020 |
| CN | 110962161 | 4/2020 |
| CN | 112500684 | 3/2021 |
| JP | H06124631 | 5/1994 |
| WO | 2018085936 | 5/2018 |

OTHER PUBLICATIONS

"Written Opinion of the International Searching Authority (Form PCT/ISA/237) of PCT/CN2020/126672," dated Jul. 26, 2021, pp. 1-6.

* cited by examiner

ELECTRO-RESPONSIVE FOLDING AND UNFOLDING COMPOSITE MATERIAL FOR 4D PRINTING, METHOD FOR MANUFACTURING SAME, AND METHOD FOR REGULATING SHAPE MEMORY BEHAVIOR THEREOF

CROSS-REFERENCE TO RELATED APPLICATION

This application is a 371 of international application of PCT application serial no. PCT/CN2020/126672, filed on Nov. 5, 2020, which claims the priority benefit of China application no. 202011181057.8, filed on Oct. 29, 2020. The entirety of each of the above mentioned patent applications is hereby incorporated by reference herein and made a part of this specification.

TECHNICAL FIELD

The present invention relates to the technical field of 4D printing, and particularly to an electro-responsive folding and unfolding composite material for 4D printing, a method for manufacturing the same, and a method for regulating shape memory behavior thereof.

BACKGROUND 4D printing is a novel manufacturing technology that integrates material, structure, and function by using additive manufacturing technology of smart materials and smart structures to realize the controllability of the shape, performance or function of components in the time and space dimensions, so as to meet the requirements for changes in shape, performance and functions in applications. However, current studies on 4D printing all focus on the printing of thermo-responsive shape memory materials, which cannot meet the requirements for changes in performance and functions in applications because the printed structure is heated as a whole in the environment and the shape memory behavior (such as the regulation on the degree and speed of shape recovery) of the structure cannot be controlled.

Electro-responsive shape memory materials, which adopt Joule heat generated by an electric heating layer embedded therein as the excitation source, possess the characteristics of being responsive to low voltages, allowing for remote actuation, and being easy to change the thermal field distribution therein, and have a huge application potential in realizing 4D printing of structures and changes in performance and functions.

For example, Chinese Patent Application No. CN110962161A discloses a stage-by-stage deformation execution device for 4D printing which can deform according to a predetermined deformation sequence and a predetermined deformation route through programmably controlled electric heating, providing a reference method for realizing 4D printing of smart materials/structures through sequential deformation. This patent, though solving some technical problems in the field of 4D printing of electro-responsive shape memory materials, fails to provide a solution to the regulation of shape memory behavior, such as the degree of shape recovery and the speed of shape recovery. The controllability of shape memory behavior is of great significance for realizing functional applications of 4D printing. The control of shape memory behavior includes, for example, precisely controlling the degree of shape recovery of a 4D printed structure so that the structure stops recovering once having recovered to a certain percentage, or controlling the structure to recover at variable speeds during the shape recovery process.

In addition, electro-responsive shape memory structures for 4D printing also have the problem of poor adhesion between the electric heating layer and the shape memory polymer matrix layer. When the structure is bent, the electric heating layer is prone to breakage and falling off, which seriously affects the electric heating performance and further affects the electro-responsive shape memory performance of the structure. Chinese Patent Application No. CN109228302A discloses a 3D printing-based electrically driven shape memory polymer slice layer and a preparation method thereof. In this method, the matrix material is pre-stretched to cause the printed electric heating layer to take an S-shape under the action of buckling behavior, so as to solve the problem that the electric heating layer is prone to falling off. However, this method involves a complex manufacturing process and the stretching scheme needs to be adjusted according to the shape of the heating position, which is not conducive to the rapid and convenient manufacturing of the structure.

SUMMARY

In view of the problems and deficiencies in the prior art, the present invention provides an electro-responsive shape memory folding and unfolding material for 4D printing and a method for manufacturing the same, to solve the problem of poor bonding performance between the metal electric heating layer and the shape memory polymer matrix, realize the embedded distribution of electric heating layers in the matrix, and improve the stability of the electrothermal performance of the structure under a high degree of bending. The present invention also provides a method for regulating shape memory behavior of the electro-responsive folding and unfolding composite material for 4D printing, to regulate the speed of shape recovery and the degree of shape recovery. By controlling the number of electric heating layers energized, the thicknesses of different regions in the same electric heating layer and the value of the energizing voltage, the shape recovery of the structure after being energized can be precisely stopped or resumed and the speed of shape recovery can be adjusted.

To achieve the above object, the following technical solutions are adopted in the present invention.

An electro-responsive folding and unfolding composite material for 4D printing, characterized by including a plurality of matrix layers with a shape memory effect and a plurality of electric heating layers with an electrothermal ability, where the matrix layers and the electric heating layers are stacked alternately, two of the matrix layers are two outermost layers, each of the electric heating layers is embedded in a groove on a side of a respective one of the matrix layers and is connected to an external wire, every two neighboring matrix layers of the matrix layers are connected to each other by bumps evenly distributed in the groove, and the bumps and the matrix layers are made of a material and are connected to form a unity.

Further, the electric heating layers at the same layer may be distributed in a plurality of regions in a uniform pattern or with different thicknesses, and the connectivity between the electrically conductive layers in the regions at the same layer needs to be ensured. The electrically conductive layers at different layers are distributed in a stacked manner in a plurality of planes, and the electrically conductive layers are separate from each other.

Further, metal nanowires in each of the electric heating layers are bonded together by laser fusion welding, and a bonding performance between the electric heating layers and the matrix layers is enhanced by laser irradiation.

Further, each of the electric heating layers has a thickness of 10-50 μm, and each of the matrix layers has a thickness of 1-5 mm.

Further, the material of the matrix layer is a shape memory epoxy polymer, a shape memory polyurethane polymer, a shape memory styrene polymer or a shape memory polyimide polymer.

Further, the bumps are distributed in an array in the groove, and have a total area accounting for 10-20% of an area of the groove.

A method for manufacturing the electro-responsive folding and unfolding composite material for 4D printing, characterized by including the following steps:

step 1: printing of a matrix layer:

printing the matrix layer on a printing platform using 3D technology, where a groove and a wire trough are printed on an upper surface of the matrix layer, and bumps having upper surfaces that are coplanar with the upper surface of the matrix layer are provided in the groove;

step 2: spray-coating of an electric heating layer:

adhering a release film to the upper surface of the matrix layer and surfaces of the bumps, to mask the matrix layer and the surfaces of the bumps and expose the groove; spray-coating a metal nanowire dispersion into the groove, stopping the spray-coating when naturally dried metal nanowires fill up the groove, and tearing off the release film, where the dried metal nanowires form an electric heating layer on the underlying matrix layer;

step 3: processing of the electric heating layer by laser-irradiation nano-fusion welding:

irradiating the electric heating layer with a laser beam, to fusion weld together the metal nanowires in the electric heating layer by nano-fusion welding;

step 4: packaging of wires:

placing the wires of positive and negative electrodes into the wire trough, and connecting the wires to the electric heating layer using a conductive adhesive;

step 5: printing of a next matrix layer:

placing a combination of the underlying matrix layer and the electric heating layer processed in the step 4 onto a 3D printer together with the printing platform, and directly printing an intermediate matrix layer on the upper surfaces of the matrix layer and the electric heating layer, where the printed intermediate matrix layer is bonded to the upper surface of the matrix layer and the bumps, and the electric heating layer is sandwiched between the matrix layer and the intermediate matrix layer;

step 6: repeating the step 2, the step 3, the step 4, and the step 5 to print and manufacture prepare subsequent matrix layers and electric heating layers, where an upper surface of a top matrix layer is planar.

Further, the printing is light curing printing, fused deposition printing or ink-jetting.

Further, the metal nanowire dispersion is a silver nanowire dispersion, an aluminum oxide nanowire dispersion, or a zinc oxide nanowire dispersion.

Further, the laser beam used in the step 3 has an energy density of 30-60 mJ/cm$^2$, a retention time of 5-10 ms in an irradiated region, and a spot diameter of 4 mm.

Further, the depth of the groove in the same matrix layer is determined by the thickness of the electric heating layer spray-coated in the matrix layer.

A method for regulating shape memory behavior of the electro-responsive folding and unfolding composite material for 4D printing, characterized by including: dividing the structure into a plurality of heat affected zones according to the plurality of electric heating layers in the matrix, where after each electric heating layer is energized, a corresponding heat affected zone is generated; controlling a distribution and range of heat affected zones in the electro-responsive shape memory folding and unfolding structure by controlling a number of electric heating layers energized, thicknesses of different regions in the same electric heating layer and a value of an energizing voltage, and regulating a speed of deformation and a degree of shape recovery according to a relationship between relative magnitudes of a shape recovery force $F_{recovery}$ and a resistance $F_{resistance}$ to shape recovery; or causing the structure to deform at different deformation speeds in different time periods of a complete deformation process by adjusting the number of electric heating layers energized and the value of the energizing voltage in real time based on the different time periods.

The present invention has the following advantages.

(1) The use of metal nanowires as the electric heating layer can ensure good contact between the nanowires when the structure undergoes a large bending deformation, thereby ensuring the stability of the electrothermal performance of the electric heating layer.

(2) The use of laser-irradiation nano-fusion welding to process the electric heating layer to melt nodes between the metal nanowires improves the contact performance between the metal nanowires, thereby improving the electrical conductivity and electrothermal performance of the electric heating layer; and also provides heating and sintering at the junctions between the metal nanowires and the underlying matrix layer, thereby improving the bonding performance between the electric heating layer and the underlying matrix layer.

(3) The middle regions of the matrix layers are connected by the bumps, which, on the one hand, can be pinned to the metal nanowires so as to embed the electric heating layer into the matrix, and on the other hand, can prevent the separation and detachment of the matrix layers and of the matrix layers and the electric heating layers.

(4) By adjusting the number of electric heating layers energized, the speed of shape recovery of the electro-responsive folding and unfolding structure for 4D printing after being energized can be adjusted in three speed ranges, and fine-tuning can further be performed within each speed range.

(5) The precise control of the degree of shape recovery of the structure is realized using a strategy of first increasing the speed and then decreasing the speed or a strategy of first increasing the speed, then maintaining at the increased speed and then decreasing the speed.

BRIEF DESCRIPTION OF THE DRAWINGS

In the figures: 1—underlying matrix layer, 2—printing platform, 3—spray gun, 4—metal nanowire dispersion, 5—laser beam, 6—first electric heating layer, 7—wire, 8—second matrix layer, 9—third matrix layer, 10—top matrix layer, 11—patterned groove, 12—bump, 13—upper surface of matrix layer, 14—wire trough, 15—release film, 16—adjustable DC-regulated power supply, 17—second electric heating layer, 18—third electric heating layer.

DETAILED DESCRIPTION OF THE EMBODIMENTS

The technical solutions of the present invention will be further described below with reference to the accompanying drawings and embodiments.

An electro-responsive shape memory folding and unfolding composite material for 4D printing according to the present invention includes n electric heating layers, n+1 matrix layers, and wires, where n is a positive integer greater than or equal to 2. A single electric heating layer has a thickness of 30-50 μm, and a single matrix layer has a thickness of 3-5 mm. The material of the matrix layers is one selected from a group consisting of a shape memory epoxy polymer, a shape memory polyurethane polymer, a shape memory styrene polymer and a shape memory polyimide polymer. Metal nanowires are one selected from a group consisting of silver nanowires, aluminum oxide nanowires, and zinc oxide nanowires, or a mixture of two or more thereof.

Figure 4:
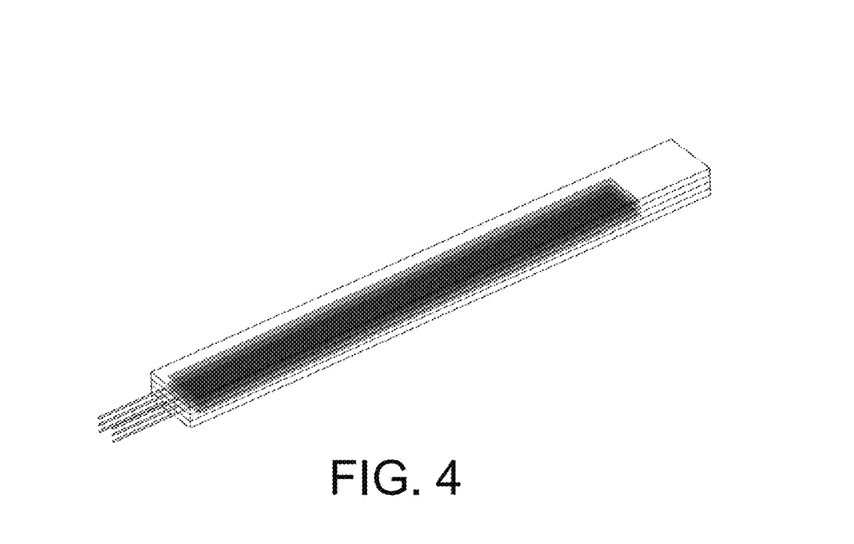
FIG. 4 is a three-dimensional perspective view of a manufactured electro-responsive folding and unfolding structure.

The matrix layers and the electric heating layers are stacked alternately, and the two outermost layers are both matrix layers. The electric heating layer is embedded in a groove on a side of the matrix layer and is connected to an external wire. Every two neighboring matrix layers are connected to each other by bumps 12 evenly distributed in the grooves. The bumps 12 and the matrix layer are made of a same material and are connected to form a unity.

Figure 2:
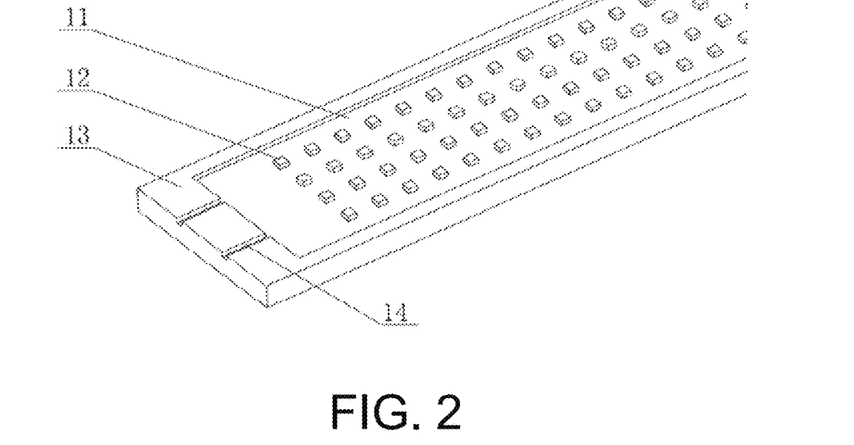
FIG. 2 is an axonometric view of a single matrix layer (except for a top matrix layer).

In the structure, an underlying matrix layer 1, a first matrix layer 8, and a second matrix layer 9 are of the same structure. A groove 11 and a wire trough 14 are provided on an upper surface 13 of each matrix layer. Bumps 12 having upper surfaces that are coplanar with the upper surface of the matrix layer are provided in the groove 11.

The bumps 12 are the same entity as the underlying matrix layer 1, the first matrix layer 8, and the second matrix layer 9 and are formed in one step through 3D printing. The surfaces of the bumps 12 are coplanar with the upper surface 13 of the matrix layer. The bumps 12 are distributed in an array in the groove 11, and have a total area accounting for about 10-20% of the area of the groove 11. The bumps 12 of one matrix layer are used for being connected and pinned to the next matrix layer, so as to embed electric heating layers 6, 17, and 18 into the matrix. In addition, the second matrix layer 8 and the third matrix layer 9 are of the same size and structure as the underlying matrix layer 1. The first electric heating layer 6, a second electric heating layer 17, and a third electric heating layer 18 are of the same size and structure. An upper surface of a top matrix layer 10 is planar, and is not provided with the groove 11, the wire trough 14, or the bumps 12.

In addition, the electric heating layers may also be arranged in other layout manners, so as to adapt to more complex requirements on deformation and the rate of deformation. To be specific, the electric heating layers at the same layer may be distributed in a plurality of regions in a uniform pattern or with different thicknesses, and the connectivity between the electrically conductive layers in the regions at the same layer needs to be ensured. The electrically conductive layers at different layers are distributed in a stacked manner in a plurality of planes, and the electrically conductive layers are separate from each other.

The electro-responsive shape memory folding and unfolding composite material for 4D printing may be manufactured by light curing printing, fused deposition printing or inkjetting. The method specifically includes the following steps:

Step 1: Printing of an Underlying Matrix Layer 1

Figure 1:
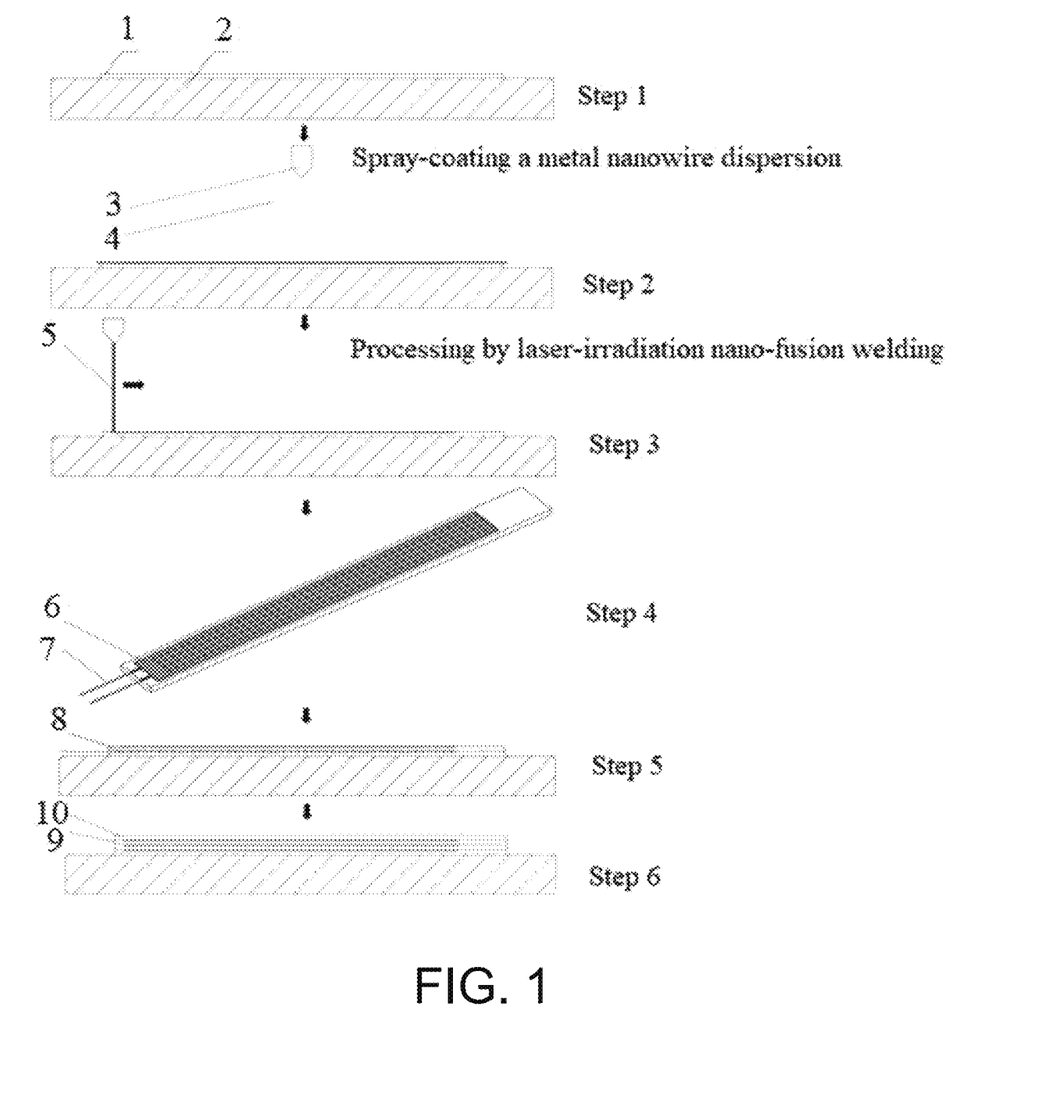
FIG. 1 is a manufacturing flowchart showing 4D printing of an electro-responsive folding and unfolding structure.

The underlying matrix layer 1 is printed on a printing platform 2. A patterned groove 11 and a wire trough 14 are printed on an upper surface 13 of the underlying matrix layer 1. Bumps 12 having upper surfaces that are coplanar with the upper surface of the underlying matrix layer 1 are provided in the groove 11.

Step 2: Spray-Coating of an Electric Heating Layer

Figure 3:
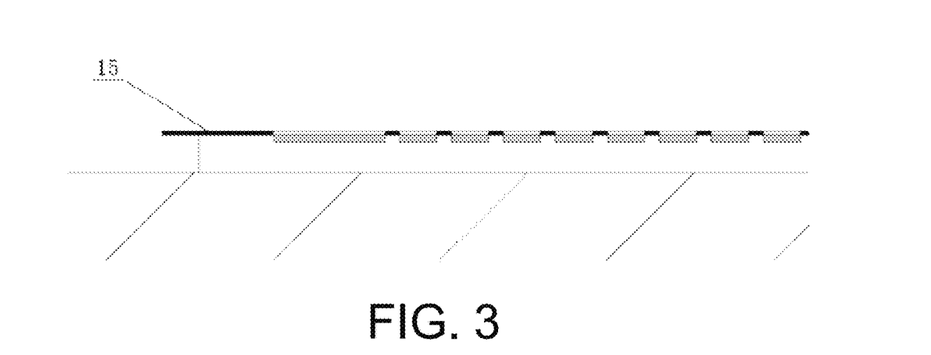
FIG. 3 is a partial enlarged view of an underlying matrix layer spray-coated with a metal nanowire dispersion.

After the printing of the underlying matrix layer 1 is complete, the printing process is paused. The underlying matrix layer 1 is taken out together with the printing platform 2, and after the remaining material on the surface is wiped off, a release film 15 is adhered to the upper surface 13 of the underlying matrix layer and surfaces of the bumps 12, to mask the surfaces and expose the groove 11. Then, a metal nanowire dispersion 4 is spray-coated on the underlying matrix layer using a spray gun 3. When naturally dried metal nanowires fill up the groove 11, the spray-coating is stopped, and the release film (15) is torn off. The dried metal nanowires form an electric heating layer on the underlying matrix layer.

Step 3: Processing of the Electric Heating Layer by Laser-Irradiation Nano-Fusion Welding A laser beam 5 is used to: irradiate the electric heating layer to melt nodes between the metal nanowires, so as to improve the contact performance between the metal nanowires, thereby improving the electrical conductivity of the electric heating layer; and provide heating and sintering at the junctions between the metal nanowires and the underlying matrix layer 1, thereby improving the bonding performance between the electric heating layer and the underlying matrix layer 1. The laser beam has an energy density of 30-60 mJ/cm², a retention time of 5-10 ms in the irradiated region, and a spot diameter of 4 mm.

Step 4: Packaging of Wires 7

The wires 7 of positive and negative electrodes are placed into the wire trough 14. The wires 7 are connected to the electric heating layer using a conductive adhesive. After drying of the conductive adhesive, the next step is performed.

Step 5: Printing of an Intermediate Matrix Layer

The combination of the underlying matrix layer 1 and the electric heating layer obtained after spray-coating and laser-irradiation nano-fusion welding is placed at the original printing position on the printer together with the printing platform 2. An intermediate matrix layer is directly printed on the upper surface 13 of the underlying matrix layer and the surfaces of the bumps 12.

Step 6: The step 2, the step 3, the step 4, and the step 5 are repeated to print and manufacture a third matrix layer 9 and an electric heating layer. The last layer of the structure is a top matrix layer 10.

Figure 5:
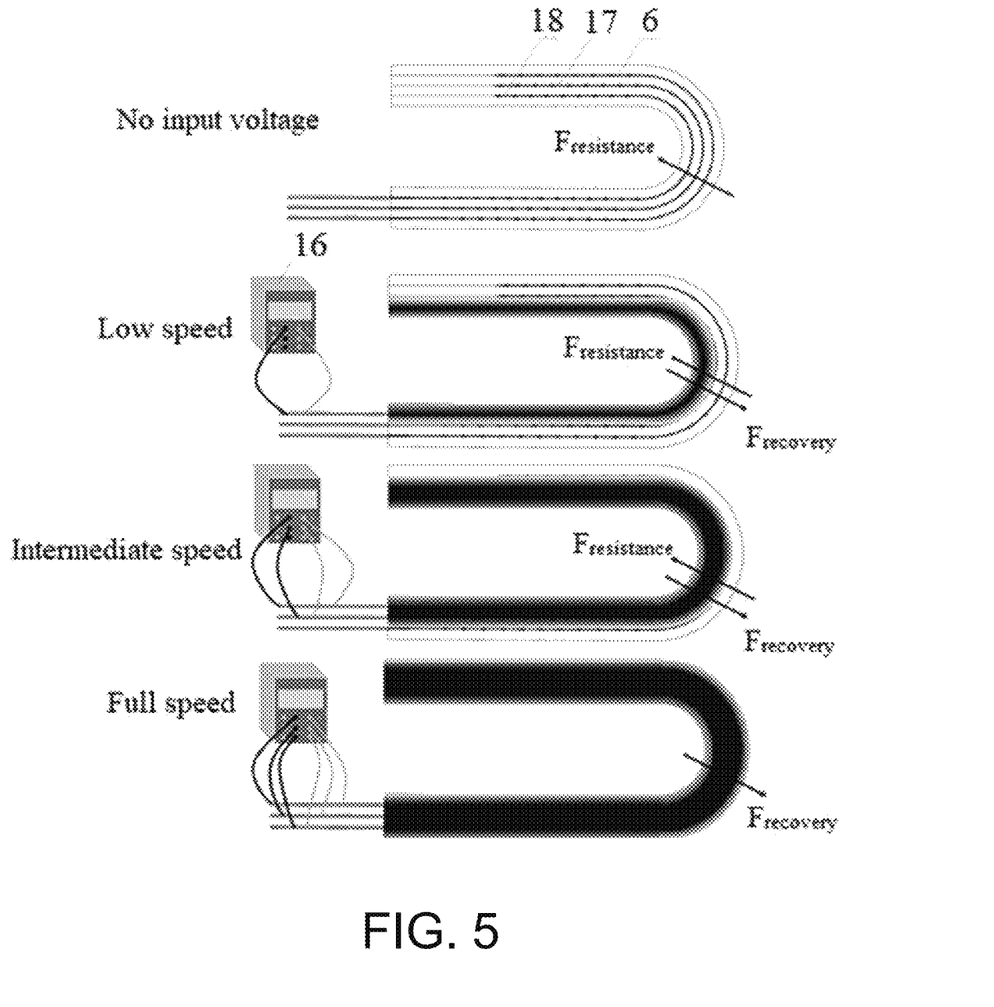
FIG. 5 is a view showing the principle of regulation of shape memory behavior of the electro-responsive folding and unfolding structure for 4D printing.

The principle and method for regulating shape memory behavior of the electro-responsive folding and unfolding composite material for 4D printing are as follows:

The structure is divided into three heat affected zones according to three electric heating layers in the matrix. After each electric heating layer is energized, a corresponding heat affected zone is generated. The distribution and range of heat affected zones in the electro-responsive folding and unfolding structure are controlled by controlling the number of electric heating layers energized and the value of an energizing voltage. The material in the heat-affected zone that reaches the glass transition temperature or melting temperature undergoes shape recovery, and has a shape recovery force $F_{recovery}$. The part of the material that is not in the heat-affected zone or that is in the heat-affected zone but does not reach the glass transition temperature or melting temperature does not undergo shape recovery, and has a resistance $F_{resistance}$ to shape recovery. A magnitude relationship between $F_{recovery}$ and $F_{resistance}$ in the structure is adjusted by controlling the distribution and range of heat affected zones in the structure, so as to control the speed of shape recovery and the degree of shape recovery of the structure.

The speed of shape recovery of the structure may fall within one of three speed ranges: a low speed range, an intermediate speed range, and a full speed range. When only one electric heating layer is energized, the recovery force $F_{recovery}$ generated by the structure is slightly greater than $F_{resistance}$, and the shape of the structure recovers slowly, in which case the speed is low. When two electric heating layers are energized, $F_{recovery}$ is further increased and $F_{resistance}$ is further decreased, in which case the speed of shape recovery of the structure is intermediate. When all the three electric heating layers are energized, the entire structure is in the heat affected zone, $F_{recovery}$ reaches its maximum, and $F_{resistance}$ can be ignored, in which case the speed of shape recovery of the structure is full speed. The speed of shape recovery in a certain speed range may further be fine-tuned by changing the value of the energizing voltage. To precisely control the degree of shape recovery of the structure, a reasonable strategy for controlling the speed of shape recovery needs to be designed and adopted. Generally, a strategy of first increasing the speed and then decreasing the speed or a strategy of first increasing the speed, then maintaining at the increased speed and then decreasing the speed is adopted. The former strategy is applicable to cases where the required degree of shape recovery is less than 50%, and the latter strategy is applicable to cases where the required degree of shape recovery is equal to or greater than 50%.

Embodiment 1

In this embodiment, the material of the matrix was shape memory polyurethane polymer light-curable resin, the metal nanowire dispersion was a silver nanowire dispersion with a concentration of 5 mg/mL, and the dispersant was isopropanol. The printing method used was light curing printing. A single electric heating layer had a thickness of 30 μm. A single matrix layer had a thickness of 3 mm. A single layer slice thickness of the digital model was 30 μm. The structure was a rectangular structure as a whole, and had an overall size of 150 mm×15 mm×12 mm. The printing steps were as follows:

Step 1: Printing of an Underlying Matrix Layer 1

The underlying matrix layer 1 was printed on a printing platform 2. A patterned groove 11, a wire trough 14, and bumps 12 were printed on an upper surface 13 of the underlying matrix layer. Surfaces of the bumps 12 were coplanar with the upper surface 13 of the matrix layer. The bumps 12 were distributed in an array in the groove 11, and had a total area accounting for 15% of the area of the groove 11. The groove had a depth of 50 μm.

Step 2: Spray-Coating of a First Electric Heating Layer 6:

After the printing of the underlying matrix layer 1 was complete, the printing process was paused. The underlying matrix layer 1 was taken out together with the printing platform 2, and after the remaining light-curable resin on the surface was wiped off, a release film 15 was adhered to the upper surface 13 of the underlying matrix layer and surfaces of the bumps 12, to mask the surfaces and expose the groove 11. Then, a silver nanowire dispersion 4 was spray-coated on the underlying matrix layer using a spray gun 3. When naturally dried silver nanowires filled up the groove 11, the spray-coating was stopped, and the release film 15 was torn off. The dried silver nanowires formed the first electric heating layer 6 on the underlying matrix layer.

Step 3: Processing of the First Electric Heating Layer 6 by Laser-Irradiation Nano-Fusion Welding A high-power laser beam 5 was used to: irradiate the electric heating layer to melt nodes between the silver nanowires, so as to improve the contact performance between the silver nanowires, thereby improving the electrical conductivity of the first electric heating layer 6; and provide heating and sintering at the junctions between the silver nanowires and the underlying matrix layer 1, thereby improving the adhesion between the first electric heating layer 6 and the underlying matrix layer 1. The laser beam had an energy density of 30 mJ/cm$^2$, a retention time of 10 ms in the irradiated region, and a spot diameter of 4 mm.

Step 4: Packaging of Wires 7

The wires 7 of positive and negative electrodes were placed into the wire trough 14. The wires 7 were connected to the first electric heating layer 6 using a conductive adhesive. After drying of the conductive adhesive, the next step was performed.

Step 5: Printing of a Second Matrix Layer 8

The combination of the underlying matrix layer 1 and the first electric heating layer 6 obtained after spray-coating and laser-irradiation nano-fusion welding was placed at the original printing position on the printer together with the printing platform 2. The second matrix layer 8 was directly printed on the upper surface 13 of the underlying matrix layer and the surfaces of the bumps 12. The bumps 12 of one matrix layer were used for being connected and pinned to the next matrix layer, so as to embed the electric heating layer 6 into the matrix.

Step 6: The step 2, the step 3, the step 4, and the step 5 were repeated to print and manufacture a second electric heating layer 17, a third matrix layer 9, and a third electric heating layer 18. The last layer of the structure was a top matrix layer 10. The second matrix layer 8 and the third matrix layer 9 were of the same size and structure as the underlying matrix layer 1. The first electric heating layer 6, the second electric heating layer 17 and the third electric heating layer 18 were of the same size and structure. The top matrix layer 10 was of a rectangular structure, and was not provided with the groove 11, the wire trough 14, or the bumps 12.

A method for controlling the speed of shape recovery of the structure was as follows:

First, three sets of interfaces of an adjustable DC-regulated power supply were respectively connected to the wires 7 of the first electric heating layer 6, the second electric heating layer 17, and the third electric heating layer 18. Input voltages at the three sets of interfaces were all 3 V. When the structure as a whole was above the melting temperature, an external force was applied to shape the structure. After the structure was shaped into a "U" shape, the supply of power was cut off, and the external force was maintained for 5 minutes. When the temperature of the structure as a whole dropped to below the melting temperature, the external force was removed, and the structure was fixed in a "U" shape.

Then, low-speed shape recovery was performed. One set of interfaces was connected to the wire 7 of the third electric heating layer 18. An input voltage was 3 V. A Joule heat affected zone generated by the third electric heating layer covered the top matrix layer 10 and the third matrix layer 9. The part in the Joule heat affected zone that reached the melting temperature began to generate a shape recovery force $F_{recovery}$, while the part that was not in the Joule heat affected zone generated by the third electric heating layer 18 and the part that was in the Joule heat affected zone but did not reach the melting temperature maintained the curved shape, and therefore had a resistance $F_{resistance}$ to shape recovery. When the input voltage was 3 V, $F_{recovery}$ was slightly greater than $F_{resistance}$, and the structure underwent low-speed shape recovery as a whole. The value of the input voltage was adjusted to fine-tune the speed of shape recovery of the structure.

Intermediate-speed shape recovery was performed. Two sets of interfaces were connected to the wires 7 of the second electric heating layer 17 and the third electric heating layer 18. Input voltages were both 3 V. A Joule heat affected zone generated by the second electric heating layer 17 and the third electric heating layer 18 covered the top matrix layer 10, the third matrix layer 9, and the second matrix layer 8. The part in the Joule heat affected zone that reached the melting temperature began to generate a shape recovery force $F_{recovery}$, while the part that was not in the Joule heat affected zone generated by the second electric heating layer 17 and the third electric heating layer 18 and the part that was in the Joule heat affected zone but did not reach the melting temperature maintained the curved shape, and therefore had a resistance $F_{resistance}$ to shape recovery. When the input voltages were both 3 V, $F_{recovery}$ was greater than $F_{resistance}$, and the structure underwent intermediate-speed shape recovery as a whole. The value of the input voltage was adjusted to fine-tune the speed of shape recovery of the structure.

Full-speed shape recovery was performed. The three sets of interfaces were respectively connected to the wires 7 of the first electric heating layer 6, the second electric heating layer 17 and the third electric heating layer 18. Input voltages were all 3 V. A Joule heat affected zone generated by the first electric heating layer 6, the second electric heating layer 17 and the third electric heating layer 18 covered the entire structure. The structure generated a shape recovery force $F_{recovery}$ as a whole, and $F_{resistance}$ generated by the part that did not reach the melting temperature could be ignored. When the input voltages were all 3 V, the structure underwent full-speed shape recovery as a whole. The value of the input voltage was adjusted to fine-tune the speed of shape recovery of the structure.

A method for precisely controlling the degree of shape recovery of the structure was as follows:

The structure was precisely controlled to stop recovering when the degree of shape recovery reached 40%. The speed control strategy of first increasing the speed and then decreasing the speed was adopted. One set of interfaces of the adjustable DC-regulated power supply was connected to the wire 7 of the third electric heating layer 18. The input voltage was increased slowly from 0 V. Joule heat generated by the third electric heating layer 18 gradually heated the top matrix layer 10 and the third matrix layer 9. $F_{recovery}$ generated by the structure also gradually increased to exceed $F_{resistance}$, which led to an increase in the speed of shape recovery. When the input voltage reached 3 V, the recovery speed reached its maximum. Then the voltage was decreased, and accordingly the recovery speed gradually decreased. The rate of decrease of the voltage was controlled to ensure that when the degree of shape recovery of the structure was 40%, $F_{resistance} \geq F_{recovery}$, the speed of shape recovery was zero, and the structure was fixed and would not recover any more.

The structure was precisely controlled to stop recovering when the degree of shape recovery reached 80%. The speed control strategy of first increasing the speed, then maintaining at the increased speed and then decreasing the speed was adopted. Two sets of interfaces of the adjustable DC-regulated power supply were respectively connected to the wires 7 of the second electric heating layer 17 and the third electric heating layer 18. Input voltages at the two sets of interfaces increased from 0 V to 3 V at the same time, and the recovery speed of the structure gradually increased and remained unchanged after reaching an intermediate speed range. When the recovery degree exceeded 60%, deceleration was performed. First, the input voltage to the second electric heating layer 17 was rapidly decreased to 0 V, so that the recovery speed of the structure decreased to a low speed range. Then the input voltage to the third electric heating layer 18 was gradually decreased. The rate of decrease of the voltage was controlled to ensure that when the degree of shape recovery of the structure was 80%, $F_{resistance} \geq F_{recovery}$, the speed of shape recovery was zero, and the structure was fixed and would not recover any more.

The above are only the preferred embodiments of the present invention and are not intended to limit the present invention. Any modification, equivalent replacement and improvement made within the spirit and principle of the present invention shall be included in the protection scope of the present invention.

What is claimed is:

1. An electro-responsive folding and unfolding composite material for 4D printing, comprising a plurality of matrix layers with a shape memory effect and a plurality of electric heating layers with an electrothermal ability, wherein the matrix layers and the electric heating layers are stacked alternately, and two of the matrix layers are two outermost layers, each of the electric heating layers is embedded in a groove on a side of a respective one of the matrix layers and is connected to an external wire, every two neighboring matrix layers of the matrix layers are connected to each other by bumps evenly distributed in the groove, and the bumps and the matrix layers are made of a same material and are connected to form a unity; metal nanowires in each of the electric heating layers are bonded together by laser fusion welding, and a bonding performance between the electric heating layers and the matrix layers is enhanced by laser irradiation.

2. The composite material according to claim 1, wherein the electric heating layers at a layer are separate from each other and are distributed in a plurality of regions, and/or the electric heating layers at different layers are separate from each other and are distributed in a staggered or stacked manner in a plurality of regions.

3. The composite material according to claim 2, wherein each of the electric heating layers has a thickness of 10-50 μm, and each of the matrix layers has a thickness of 1-5 mm.

4. The composite material according to claim 2, wherein the electric heating layers in different regions at the layer or the electric heating layers at the different layers have different thicknesses.

5. The composite material according to claim 1, wherein the material of the matrix layers is a shape memory epoxy polymer, a shape memory polyurethane polymer, a shape memory styrene polymer or a shape memory polyimide polymer; and the metal nanowires are one selected from a group consisting of silver nanowires, aluminum oxide nanowires, and zinc oxide nanowires, or a mixture of two or more thereof.

6. The composite material according to claim 1, wherein the bumps are distributed in an array in the groove, and have a total area accounting for 10-20% of an area of the groove.

7. A method for manufacturing the electro-responsive folding and unfolding composite material for 4D printing according to claim 1, comprising the following steps:
step 1: printing of an underlying matrix layer:
printing the underlying matrix layer on a printing platform using a 3D technology, wherein the groove and a wire trough are printed on an upper surface of the underlying matrix layer, and the bumps having upper surfaces that are coplanar with the upper surface of the underlying matrix layer are provided in the groove;
step 2: spray-coating of an electric heating layer:
adhering a release film to the upper surface of the underlying matrix layer and surfaces of the bumps, to mask the underlying matrix layer and the surfaces of the bumps and expose the groove; spray-coating a metal nanowire dispersion into the groove, stopping the spray-coating when the naturally dried metal nanowires fill up the groove, and tearing off the release film, wherein the dried metal nanowires form the electric heating layer on the underlying matrix layer;
step 3: processing of the electric heating layer by laser-irradiation nano-fusion welding:
irradiating the electric heating layer with a laser beam, to fusion weld together the metal nanowires in the electric heating layer by nano-fusion welding;
step 4: packaging of wires:
placing the wires of positive and negative electrodes into the wire trough, and connecting the wires to the electric heating layer using a conductive adhesive;
step 5: printing of an intermediate matrix layer:
placing a combination of the underlying matrix layer and the electric heating layer processed in the step 4 onto a 3D printer together with the printing platform, and directly printing the intermediate matrix layer on the upper surface of the underlying matrix layer and an upper surface of the electric heating layer, wherein the printed intermediate matrix layer is bonded to the upper surface of the underlying matrix layer or the intermediate matrix layer and the bumps, and the electric heating layer is sandwiched between the underlying matrix layer and the intermediate matrix layer, and the intermediate matrix layer and the underlying matrix layer are of an identical structure; and
step 6: repeating the step 2, the step 3, the step 4, and the step 5 to print and manufacture subsequent matrix layers and electric heating layers, wherein an upper surface of a top matrix layer is planar.

8. The manufacturing method according to claim 7, wherein the printing is light curing printing, fused deposition printing or ink-jetting; and the laser beam used in the step 3 has an energy density of 30-60 mJ/cm$^2$, a retention time of 5-10 ms in an irradiated region, and a spot diameter of 4 mm.

9. A method for regulating a shape memory behavior of the electro-responsive folding and unfolding composite material for 4D printing according to claim 1, comprising: dividing the structure into a plurality of heat affected zones according to the plurality of electric heating layers in the matrix, wherein after each electric heating layer is energized, a corresponding heat affected zone is generated; controlling a distribution and range of heat affected zones in the electro-responsive shape memory folding and unfolding structure by controlling a number of electric heating layers energized, thicknesses of different regions in the same electric heating layer and a value of an energizing voltage, and regulating a speed of deformation and a degree of shape recovery according to a relationship between relative magnitudes of a shape recovery force $F_{recovery}$ and a resistance $F_{resistance}$ to shape recovery; or causing the structure to deform at different deformation speeds in different time periods of a complete deformation process by adjusting the number of electric heating layers energized and the value of the energizing voltage in real time based on the different time periods.

10. The composite material according to claim 2, wherein the material of the matrix layers is a shape memory epoxy polymer, a shape memory polyurethane polymer, a shape memory styrene polymer or a shape memory polyimide polymer; and the metal nanowires are one selected from a group consisting of silver nanowires, aluminum oxide nanowires, and zinc oxide nanowires, or a mixture of two or more thereof.

11. The composite material according to claim 2, wherein the bumps are distributed in an array in the groove, and have a total area accounting for 10-20% of an area of the groove.

12. A method for manufacturing the electro-responsive folding and unfolding composite material for 4D printing according to claim 2, comprising the following steps:
step 1: printing of an underlying matrix layer:
printing the underlying matrix layer on a printing platform using a 3D technology, wherein the groove and a wire trough are printed on an upper surface of the underlying matrix layer, and the bumps having upper surfaces that are coplanar with the upper surface of the underlying matrix layer are provided in the groove;
step 2: spray-coating of an electric heating layer:
adhering a release film to the upper surface of the underlying matrix layer and surfaces of the bumps, to mask the underlying matrix layer and the surfaces of the bumps and expose the groove; spray-coating a metal nanowire dispersion into the groove, stopping the spray-coating when the naturally dried metal nanowires fill up the groove, and tearing off the release film, wherein the dried metal nanowires form the electric heating layer on the underlying matrix layer;
step 3: processing of the electric heating layer by laser-irradiation nano-fusion welding:
irradiating the electric heating layer with a laser beam, to fusion weld together the metal nanowires in the electric heating layer by nano-fusion welding;
step 4: packaging of wires:
placing the wires of positive and negative electrodes into the wire trough, and connecting the wires to the electric heating layer using a conductive adhesive;
step 5: printing of an intermediate matrix layer:
placing a combination of the underlying matrix layer and the electric heating layer processed in the step 4 onto a 3D printer together with the printing platform, and directly printing the intermediate matrix layer on the upper surface of the underlying matrix layer and an upper surface of the electric heating layer, wherein the printed intermediate matrix layer is bonded to the upper surface of the underlying matrix layer or the intermediate matrix layer and the bumps, and the electric heating layer is sandwiched between the underlying matrix layer and the intermediate matrix layer, and the intermediate matrix layer and the underlying matrix layer are of an identical structure; and step 6: repeating the step 2, the step 3, the step 4, and the step 5 to print and manufacture subsequent matrix layers and electric heating layers, wherein an upper surface of a top matrix layer is planar.

13. The manufacturing method according to claim 12, wherein the printing is light curing printing, fused deposition printing or ink-jetting; and the laser beam used in the step 3 has an energy density of 30-60 mJ/cm$^2$, a retention time of 5-10 ms in an irradiated region, and a spot diameter of 4 mm.

14. A method for manufacturing the electro-responsive folding and unfolding composite material for 4D printing according to claim 3, comprising the following steps:

step 1: printing of an underlying matrix layer:

printing the underlying matrix layer on a printing platform using a 3D technology, wherein the groove and a wire trough are printed on an upper surface of the underlying matrix layer, and the bumps having upper surfaces that are coplanar with the upper surface of the underlying matrix layer are provided in the groove;

step 2: spray-coating of an electric heating layer:

adhering a release film to the upper surface of the underlying matrix layer and surfaces of the bumps, to mask the underlying matrix layer and the surfaces of the bumps and expose the groove; spray-coating a metal nanowire dispersion into the groove, stopping the spray-coating when the naturally dried metal nanowires fill up the groove, and tearing off the release film, wherein the dried metal nanowires form the electric heating layer on the underlying matrix layer;

step 3: processing of the electric heating layer by laser-irradiation nano-fusion welding:

irradiating the electric heating layer with a laser beam, to fusion weld together the metal nanowires in the electric heating layer by nano-fusion welding;

step 4: packaging of wires:

placing the wires of positive and negative electrodes into the wire trough, and connecting the wires to the electric heating layer using a conductive adhesive;

step 5: printing of an intermediate matrix layer:

placing a combination of the underlying matrix layer and the electric heating layer processed in the step 4 onto a 3D printer together with the printing platform, and directly printing the intermediate matrix layer on the upper surface of the underlying matrix layer and an upper surface of the electric heating layer, wherein the printed intermediate matrix layer is bonded to the upper surface of the underlying matrix layer or the intermediate matrix layer and the bumps, and the electric heating layer is sandwiched between the underlying matrix layer and the intermediate matrix layer, and the intermediate matrix layer and the underlying matrix layer are of an identical structure; and step 6: repeating the step 2, the step 3, the step 4, and the step 5 to print and manufacture subsequent matrix layers and electric heating layers, wherein an upper surface of a top matrix layer is planar.

15. The manufacturing method according to claim 14, wherein the printing is light curing printing, fused deposition printing or ink-jetting; and the laser beam used in the step 3 has an energy density of 30-60 mJ/cm$^2$, a retention time of 5-10 ms in an irradiated region, and a spot diameter of 4 mm.

16. A method for manufacturing the electro-responsive folding and unfolding composite material for 4D printing according to claim 4, comprising the following steps:

step 1: printing of an underlying matrix layer:

printing the underlying matrix layer on a printing platform using a 3D technology, wherein the groove and a wire trough are printed on an upper surface of the underlying matrix layer, and the bumps having upper surfaces that are coplanar with the upper surface of the underlying matrix layer are provided in the groove;

step 2: spray-coating of an electric heating layer:

adhering a release film to the upper surface of the underlying matrix layer and surfaces of the bumps, to mask the underlying matrix layer and the surfaces of the bumps and expose the groove; spray-coating a metal nanowire dispersion into the groove, stopping the spray-coating when the naturally dried metal nanowires fill up the groove, and tearing off the release film, wherein the dried metal nanowires form the electric heating layer on the underlying matrix layer;

step 3: processing of the electric heating layer by laser-irradiation nano-fusion welding:

irradiating the electric heating layer with a laser beam, to fusion weld together the metal nanowires in the electric heating layer by nano-fusion welding;

step 4: packaging of wires:

placing the wires of positive and negative electrodes into the wire trough, and connecting the wires to the electric heating layer using a conductive adhesive;

step 5: printing of an intermediate matrix layer:

placing a combination of the underlying matrix layer and the electric heating layer processed in the step 4 onto a 3D printer together with the printing platform, and directly printing the intermediate matrix layer on the upper surface of the underlying matrix layer and an upper surface of the electric heating layer, wherein the printed intermediate matrix layer is bonded to the upper surface of the underlying matrix layer or the intermediate matrix layer and the bumps, and the electric heating layer is sandwiched between the underlying matrix layer and the intermediate matrix layer, and the intermediate matrix layer and the underlying matrix layer are of an identical structure; and step 6: repeating the step 2, the step 3, the step 4, and the step 5 to print and manufacture subsequent matrix layers and electric heating layers, wherein an upper surface of a top matrix layer is planar.

17. The manufacturing method according to claim 16, wherein the printing is light curing printing, fused deposition printing or ink-jetting; and the laser beam used in the step 3 has an energy density of 30-60 mJ/cm$^2$, a retention time of 5-10 ms in an irradiated region, and a spot diameter of 4 mm.

18. A method for manufacturing the electro-responsive folding and unfolding composite material for 4D printing according to claim 5, comprising the following steps:

step 1: printing of an underlying matrix layer:

printing the underlying matrix layer on a printing platform using a 3D technology, wherein the groove and a wire trough are printed on an upper surface of the underlying matrix layer, and the bumps having upper surfaces that are coplanar with the upper surface of the underlying matrix layer are provided in the groove;

step 2: spray-coating of an electric heating layer:

adhering a release film to the upper surface of the underlying matrix layer and surfaces of the bumps, to mask the underlying matrix layer and the surfaces of the bumps and expose the groove; spray-coating a metal nanowire dispersion into the groove, stopping the spray-coating when the naturally dried metal nanowires fill up the groove, and tearing off the release film, wherein the dried metal nanowires form the electric heating layer on the underlying matrix layer;

step 3: processing of the electric heating layer by laser-irradiation nano-fusion welding:

irradiating the electric heating layer with a laser beam, to fusion weld together the metal nanowires in the electric heating layer by nano-fusion welding;

step 4: packaging of wires:

placing the wires of positive and negative electrodes into the wire trough, and connecting the wires to the electric heating layer using a conductive adhesive;

step 5: printing of an intermediate matrix layer:

placing a combination of the underlying matrix layer and the electric heating layer processed in the step 4 onto a 3D printer together with the printing platform, and directly printing the intermediate matrix layer on the upper surface of the underlying matrix layer and an upper surface of the electric heating layer, wherein the printed intermediate matrix layer is bonded to the upper surface of the underlying matrix layer or the intermediate matrix layer and the bumps, and the electric heating layer is sandwiched between the underlying matrix layer and the intermediate matrix layer, and the intermediate matrix layer and the underlying matrix layer are of an identical structure; and step 6: repeating the step 2, the step 3, the step 4, and the step 5 to print and manufacture subsequent matrix layers and electric heating layers, wherein an upper surface of a top matrix layer is planar.

19. The manufacturing method according to claim 18, wherein the printing is light curing printing, fused deposition printing or ink-jetting; and the laser beam used in the step 3 has an energy density of 30-60 mJ/cm$^2$, a retention time of 5-10 ms in an irradiated region, and a spot diameter of 4 mm.

20. A method for manufacturing the electro-responsive folding and unfolding composite material for 4D printing according to claim 6, comprising the following steps:

step 1: printing of an underlying matrix layer:

printing the underlying matrix layer on a printing platform using a 3D technology, wherein the groove and a wire trough are printed on an upper surface of the underlying matrix layer, and the bumps having upper surfaces that are coplanar with the upper surface of the underlying matrix layer are provided in the groove;

step 2: spray-coating of an electric heating layer:

adhering a release film to the upper surface of the underlying matrix layer and surfaces of the bumps, to mask the underlying matrix layer and the surfaces of the bumps and expose the groove; spray-coating a metal nanowire dispersion into the groove, stopping the spray-coating when the naturally dried metal nanowires fill up the groove, and tearing off the release film, wherein the dried metal nanowires form the electric heating layer on the underlying matrix layer;

step 3: processing of the electric heating layer by laser-irradiation nano-fusion welding:

irradiating the electric heating layer with a laser beam, to fusion weld together the metal nanowires in the electric heating layer by nano-fusion welding;

step 4: packaging of wires:

placing the wires of positive and negative electrodes into the wire trough, and connecting the wires to the electric heating layer using a conductive adhesive;

step 5: printing of an intermediate matrix layer:

placing a combination of the underlying matrix layer and the electric heating layer processed in the step 4 onto a 3D printer together with the printing platform, and directly printing the intermediate matrix layer on the upper surface of the underlying matrix layer and an upper surface of the electric heating layer, wherein the printed intermediate matrix layer is bonded to the upper surface of the underlying matrix layer or the intermediate matrix layer and the bumps, and the electric heating layer is sandwiched between the underlying matrix layer and the intermediate matrix layer, and the intermediate matrix layer and the underlying matrix layer are of an identical structure; and step 6: repeating the step 2a, the step 3, the step 4, and the step 5 to print and manufacture subsequent matrix layers and electric heating layers, wherein an upper surface of a top matrix layer is planar.

\* \* \* \* \*